(12) United States Patent
Baller et al.

(10) Patent No.: US 8,072,748 B2
(45) Date of Patent: Dec. 6, 2011

(54) PORTABLE ELECTRONIC DEVICE

(75) Inventors: Martijn Baller, Taipei (TW);
Meng-Hsuan Shih, Taipei (TW);
Chi-Chen Lin, Taipei (TW); Chien-Hsu Hou, Taipei (TW); Yen-Liang Chen, Taipei (TW); Chia-Ying Lee, Taipei (TW); Wei-Chun Chien, Taipei (TW); Yung-Chie Huang, Taipei (TW); Jia-Rong Lin, Taipei (TW); Ching-Hao Yu, Taipei (TW)

(73) Assignee: Pegatron Corporation, Taipei (TW)

( * ) Notice: Subject to any disclaimer, the term of this patent is extended or adjusted under 35 U.S.C. 154(b) by 308 days.

(21) Appl. No.: 12/545,419

(22) Filed: Aug. 21, 2009

(65) Prior Publication Data
US 2010/0046151 A1 Feb. 25, 2010

(30) Foreign Application Priority Data

Aug. 25, 2008 (TW) ............................... 97132433 A

(51) Int. Cl.
*G06F 1/16* (2006.01)

(52) U.S. Cl. ................ 361/679.55; 248/118.3; 248/118; 400/715

(58) Field of Classification Search ............... 364/708.1, 364/708; 248/118, 118.1, 118.3, 918, 631; 400/715, 691, 693, 679; 361/679.01, 679.55
See application file for complete search history.

(56) References Cited

U.S. PATENT DOCUMENTS

| 5,210,532 | A | * | 5/1993 | Knoedler et al. | 248/126 |
| 5,610,992 | A | * | 3/1997 | Hickman | 381/386 |
| 5,682,290 | A | * | 10/1997 | Markow et al. | 361/679.55 |
| 5,761,322 | A | * | 6/1998 | Illingworth et al. | 381/386 |
| 5,838,537 | A | | 11/1998 | Lundgren et al. | |
| 5,847,922 | A | * | 12/1998 | Smith et al. | 361/679.41 |
| 6,081,421 | A | * | 6/2000 | Markow et al. | 361/679.09 |
| 6,195,255 | B1 | * | 2/2001 | Kim | 361/679.19 |
| 6,597,794 | B2 | * | 7/2003 | Cole et al. | 381/333 |
| 6,693,367 | B1 | * | 2/2004 | Schmeisser et al. | 307/9.1 |
| 6,925,188 | B1 | * | 8/2005 | Markow et al. | 381/306 |
| 7,230,825 | B2 | | 6/2007 | Sawyer | |
| 7,254,015 | B2 | * | 8/2007 | Yin et al. | 361/679.55 |
| 7,382,607 | B2 | * | 6/2008 | Skillman | 361/679.55 |
| 7,385,806 | B2 | * | 6/2008 | Liao | 361/679.01 |
| 2008/0043410 | A1 | * | 2/2008 | Yu | 361/681 |
| 2010/0002377 | A1 | * | 1/2010 | Kim | 361/679.55 |
| 2010/0046163 | A1 | * | 2/2010 | Yu et al. | 361/679.55 |
| 2011/0019342 | A1 | * | 1/2011 | Moore | 361/679.01 |

FOREIGN PATENT DOCUMENTS

| CN | 2280958 | 5/1998 |
| CN | 2552087 Y | 5/2003 |
| CN | 101047784 | 10/2007 |

* cited by examiner

*Primary Examiner* — Lisa Lea Edmonds
(74) *Attorney, Agent, or Firm* — Muncy, Geissler, Olds & Lowe, PLLC

(57) ABSTRACT

A portable electronic device includes a casing, a key, a loudspeaker, a soft insulating material, and an actuating unit. The key is disposed at the casing. The loudspeaker is embedded into the casing flatly. The soft insulating material covers the casing and the loudspeaker. The actuating unit is coupled to the key and the loudspeaker, and it actuates the loudspeaker to protrude from the casing in response to an actuation of the key.

11 Claims, 4 Drawing Sheets

PORTABLE ELECTRONIC DEVICE

CROSS REFERENCE TO RELATED APPLICATIONS

This Non-provisional application claims priority under 35 U.S.C. §119(a) on patent application Ser. No(s). 097132433 filed in Taiwan, Republic of China on Aug. 25, 2008, the entire contents of which are hereby incorporated by reference.

BACKGROUND OF THE INVENTION

1. Field of Invention

The invention relates to an electronic device and, more particularly, to a portable electronic device having a loudspeaker.

2. Related Art

With the development of science and electronic devices, portable electronic devices have become popular consumer products. For example, a notebook computer, a mobile communication device, and a media player have become necessaries in daily life. The portable electronic devices have loudspeakers to play sound or music. In addition to functions, novelty and fashion are important in designing different kinds of the consumer electronic devices. The design and the style of products are also main factors affecting purchase by the consumers.

SUMMARY OF THE INVENTION

This invention provides a portable electronic device having a loudspeaker with a fashion and function design to improve competitiveness of the device.

According to one aspect of the invention, the portable electronic device includes a casing, a key, a loudspeaker, a soft insulating material, and an actuating unit. The key is disposed at the casing. The loudspeaker is embedded into the casing flatly. The soft insulating material covers the casing and the loudspeaker. The actuating unit is coupled to the key and the loudspeaker, and it actuates the loudspeaker to protrude from the casing in response to an actuation of the key.

In one embodiment of the invention, the soft insulating material may include cloth, leather, synthetic leather, rubber, silica gel, or a combination thereof.

According to another aspect of the invention, the portable electronic device includes a casing, a loudspeaker, a soft insulating material, and an actuating unit. The loudspeaker is embedded into the casing flatly. The soft insulating material covers the casing and the loudspeaker. The actuating unit is coupled to the loudspeaker, and it actuates the loudspeaker to protrude from the casing in response to an operation signal.

In one embodiment of the invention, the soft insulating material may include cloth, leather, synthetic leather, rubber, silica gel, or a combination thereof.

In one embodiment of the invention, the operation signal may be a boot-up signal, a shutoff signal, or a signal of using software.

To sum up, in the invention, when the key is actuated, the loudspeaker can be actuated to move upward or downward by the actuating unit. The loudspeaker can also be actuated to move upward or downward by the actuating unit according to the operation signal such as a boot-up signal, a shutoff signal, or a signal of using software. For example, when a user presses a power key to boot up a device, the adjacent loudspeaker moves upward; or when the user starts media software, the loudspeaker moves upward; or when the user shuts off the device, the upward loudspeaker moves downward. Thereby, the fashion design may be improved. Further, when the user does not need to use the loudspeaker, he or she can be prevented from contacting the loudspeaker.

In addition, the soft insulating material, such as cloth, leather, or silica gel and so on, covers the loudspeaker. Thus, when the loudspeaker moves upward, the soft insulating material provides a protrudent and recessed feeling, thereby providing different textures. Further, the soft insulating material absorbs perspiration or liquid inadvertently falling.

These and other features, aspects, and advantages of the present invention will become better understood with regard to the following description, appended claims, and accompanying drawings.

DETAILED DESCRIPTION OF THE INVENTION

Figure 1:
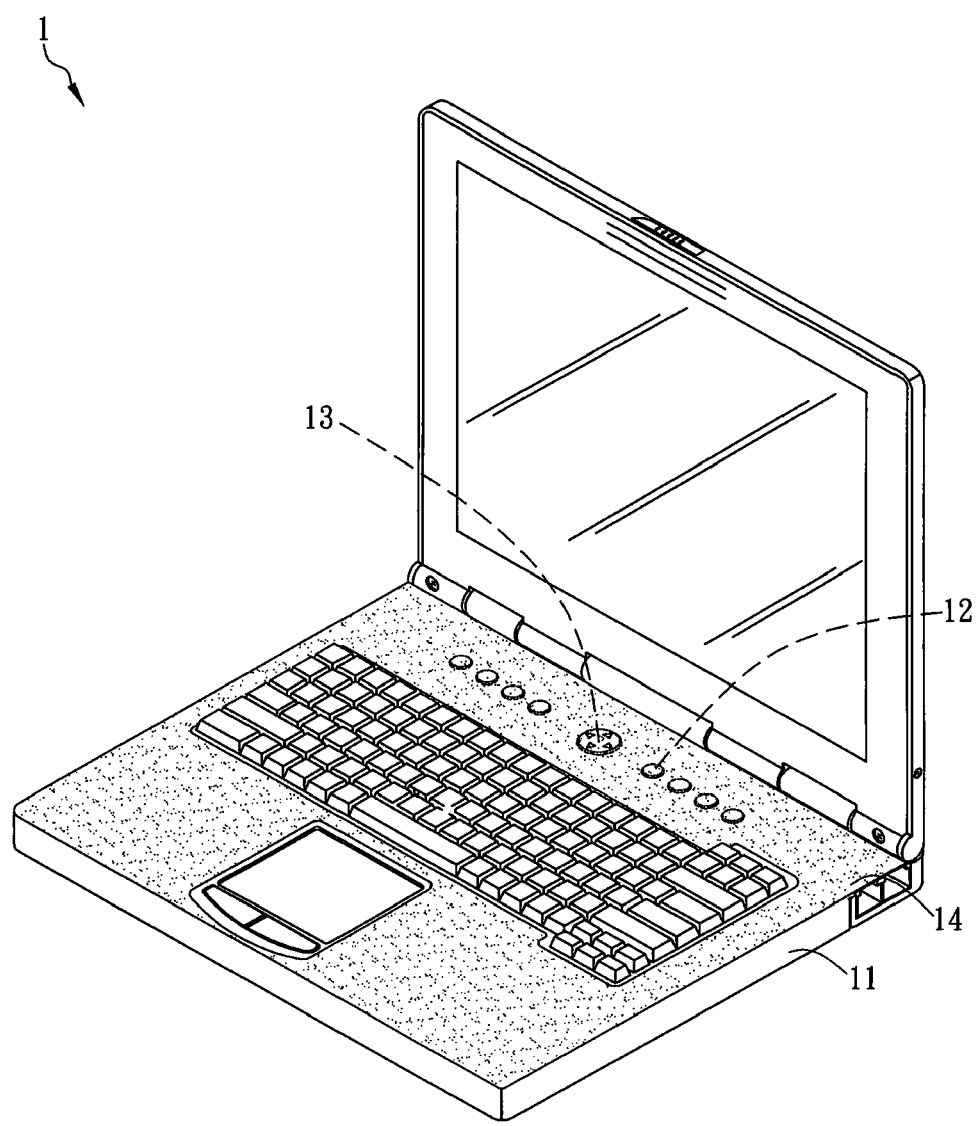
FIG. 1 is a schematic diagram showing a portable electronic device according to a preferred embodiment of the invention.

FIG. 1 is a schematic diagram showing a portable electronic device 1 according to a preferred embodiment of the invention. The portable electronic device 1 includes a casing 11, a key 12, a loudspeaker 13, and a soft insulating material 14. In the embodiment, a notebook computer as the portable electronic device 1 is taken for example. However, the invention does not limit the type of the portable electronic device 1. The portable electronic device 1 may be a keyboard, a communication device, a media player, or other portable electronic devices having the above elements.

In the embodiment, a casing at a keyboard side of the notebook computer as the casing 11 is taken for example. The key 12 is disposed at the casing 11. In the embodiment, a power key as the key 12 is taken for example. The key 12 may be other keys on the portable electronic device 1. The loudspeaker 13 is embedded into the casing 11 flatly. That is, the loudspeaker 13 is not protrudent from the casing at all. The loudspeaker 13 can include a magnetic element, a vibrating element, a vibrating diaphragm, a sound box and so on for producing sound. The soft insulating material 14 covers the casing 11 and the loudspeaker 13. The soft insulating material 14 can partly or fully cover the casing 11. In addition, the soft insulating material 14 can cover other elements such as the key 12 and other keys. The soft insulating material 14 may include a plant material, an animal material, a synthetic material, or a combination thereof, such as cloth, leather, synthetic leather, rubber, silica gel, or a combination thereof.

In addition, the portable electronic device 1 further includes an actuating unit (not shown in FIG. 1) coupled to the key 12 and the loudspeaker 13. In response to an actuation of the key 12, the actuating unit actuates the loudspeaker 13 to protrude from the casing 11. For example, when a user presses the key 12, the actuating unit actuates the loudspeaker 13 to protrude from the casing 11. When the user represses the key 12, the loudspeaker 13 moves downward.

Figure 3:
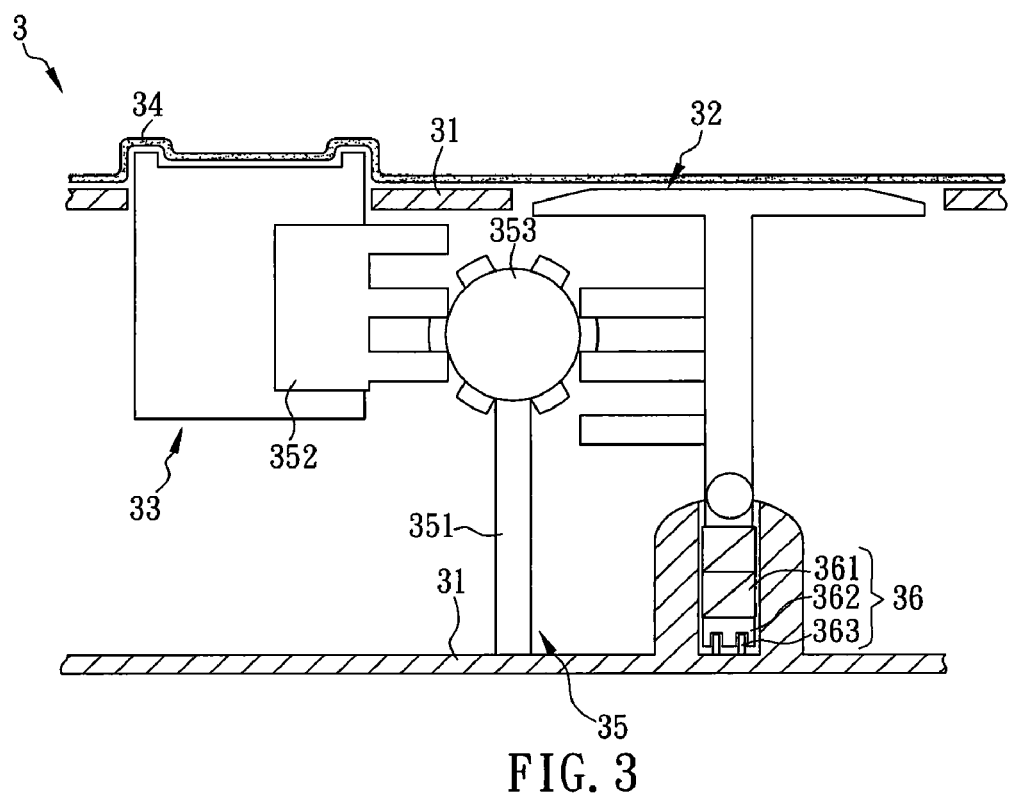
Figure 4:
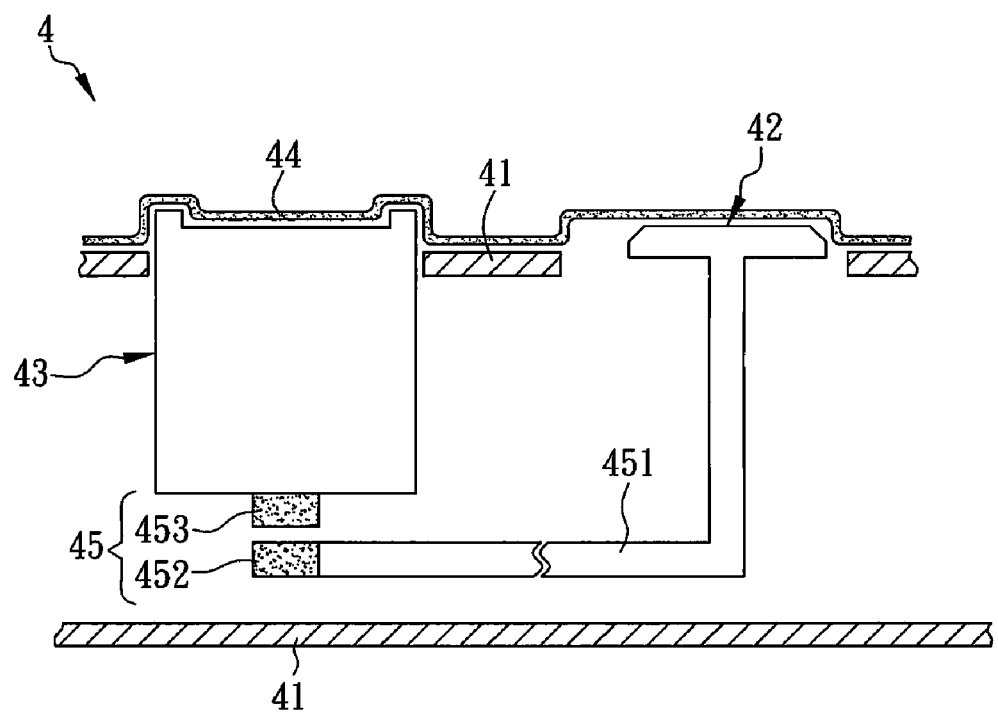
Figure 5:
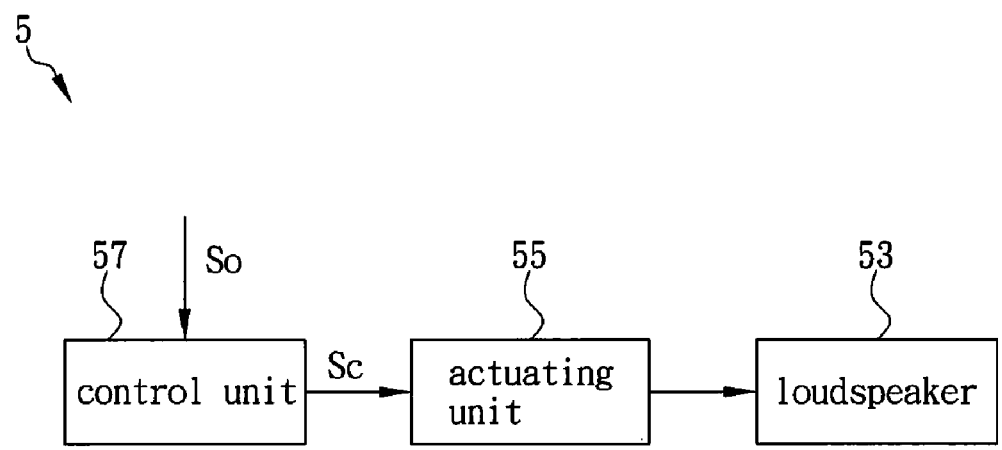
FIG. 5 is a block schematic diagram showing a portable electronic device according to another preferred embodiment of the invention.

In the embodiment, the actuating unit has a plurality of forms to actuate the loudspeaker 13 to move upward or downward. FIGS. 3-5 are taken for example. Different reference marks are used in different embodiments.

Figure 2:
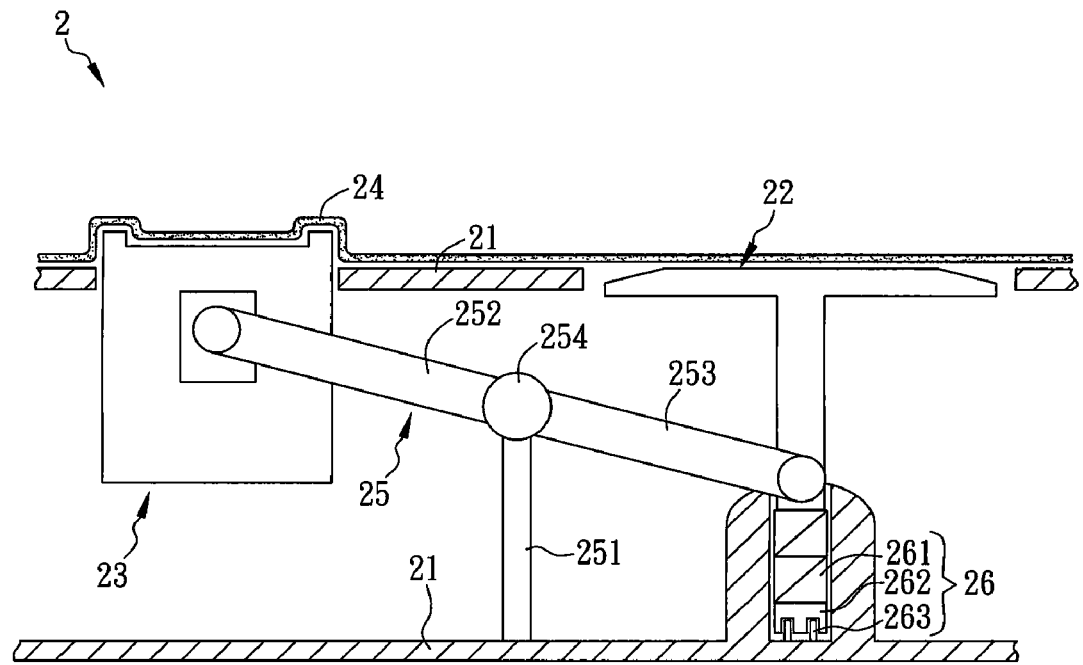
FIGS. 2-4 are schematic diagrams showing a loudspeaker of a portable electronic device moving upward or downward by a structural design according to a preferred embodiment of the invention.

In FIG. 2, a portable electronic device 2 includes a casing 21, a key 22, a loudspeaker 23, a soft insulating material 24, and an actuating unit 25. The key 22 is disposed at the casing 21. The loudspeaker 23 is embedded into the casing 21. The soft insulating material 24 covers the casing 21 and the loudspeaker 23. The actuating unit 25 is coupled to the key 22 and the loudspeaker 23. In response to an actuation of the key 22, the loudspeaker 23 is actuated to move upward to protrude from the casing 21 or to move downward to make the casing 21 flat.

The actuating unit 25 can include a gear, a connection rod, a hinge, a magnet, other actuating elements, or a combination thereof. In this embodiment, the actuating unit 25 includes connection rods 251, 252, 253 and a hinge 254. One respective end of the connection rods 251, 252, 253 is connected to the hinge 254, and the other respective end is connected to the casing 21, the loudspeaker 23, and the key 22, respectively. The connection rods 252, 253 rotate around the hinge 254. In addition, the key 22 is connected with a push-push type structure 26. In this embodiment, the push-push type structure 26 has an elastic element 261 and two contacting portions 262, 263. The contacting portion 263 is fixed, and the contacting portion 262 is connected with the elastic element 261. The push-push type structure 26 has a pressing state and a restoring state. In this embodiment, the pressing state is shown in FIG. 2. When the push-push type structure 26 is in the pressing state, the elastic element 261 is pressed and the two contacting portions 262, 263 are fixed to each other. When the push-push type structure 26 is in the restoring state, the elastic element 261 is restored and the two contacting portions 262, 263 are separated.

Thereby, when a user presses the key 22 (such as a boot-up operation), the actuation of the connection rods 252, 253 makes the loudspeaker 23 move upward to protrude from the casing 21 (as shown in FIG. 2). When the user represses the key 22 (such as a shutoff operation), the push-push type structure 26 returns to the restoring state. That is, the connection rods 262, 263 are actuated by the hinge 254 to make the loudspeaker 23 move downward, thus to make the casing 21 flat. Since the soft insulating material 24 covers the loudspeaker 23, when the loudspeaker 23 moves upward, the soft insulating material 24 may provide a protrudent and recessed feeling, thereby providing a fashion design. Further, the loudspeaker 23 is protrudent from the casing 21 and thus it can provide different musical quality.

In FIG. 3, a portable electronic device 3 includes a casing 31, a key 32, a loudspeaker 33, a soft insulating material 34, and an actuating unit 35. The key 32 is disposed at the casing 31. The loudspeaker 33 is embedded into the casing 31. The soft insulating material 34 covers the casing 31 and the loudspeaker 33. The actuating unit 35 is coupled to the key 32 and the loudspeaker 33. According to an actuation of the key 32, the loudspeaker 33 is actuated to move upward or to move downward, i.e. protrude from the casing 31 or not.

The actuating unit 35 can include a gear, a connection rod, a hinge, a magnet, other actuating elements, or a combination thereof, and it can be determined according to practical needs. In this embodiment, the actuating unit 35 includes connection rods 351, 352 and a gear 353. One end of the connection rod 351 is connected with the casing 31, and the other end is connected with the gear 353. The connection rod 352 is connected with the loudspeaker 33 and has a plurality of recessed portions engaged with the gear 353. In addition, the key 32 also has a plurality of recessed portions engaged with the gear 353. In addition, the key 32 is connected with a push-push type structure 36.

Thereby, when a user presses the key 32, such as a boot-up operation, the push-push type structure 36 is pressed to drive the gear 353 to rotate clockwise, further to drive the loudspeaker 33 to move upward to protrude from the casing 31, as shown in FIG. 3. When the user represses the key 32, such as a shutoff operation, the push-push type structure 36 returns to a restoring state, further to drive the gear 353 to rotate counter-clockwise, thus to make the loudspeaker 33 move downward to make the casing 31 flat.

In FIG. 4, a portable electronic device 4 includes a casing 41, a key 42, a loudspeaker 43, a soft insulating material 44, and an actuating unit 45. The key 42 is disposed at the casing 41. The loudspeaker 43 is embedded into the casing 41. The soft insulating material 44 covers the casing 41 and the loudspeaker 43. The actuating unit 45 is coupled to the key 42 and the loudspeaker 43. According to an actuation of the key 42, the loudspeaker 43 is actuated to move upward to protrude from the casing 41 or to move downward to make the casing 41 flat.

The actuating unit 45 can include a gear, a connection rod, a hinge, a magnet, other actuating elements, or a combination thereof, and it can be designed according to practical needs. In this embodiment, the actuating unit 45 includes a connection rod 451 and magnets 452, 453. The connection rod 451 is connected with the key 42, the magnet 452 is disposed at the connection rod 451, and the magnet 453 is disposed at the loudspeaker 43.

In this embodiment, a pressing direction of the key 42 is horizontal. That is, when a user is to operate the key 42, he or she can move the key 42 leftward or rightward. Thereby, when the user presses the key 42, such as moving the key 42 rightward to boot up a device as shown in FIG. 4, the connection rod 451 can drive the magnet 452 to align with the magnet 453. Further, since the magnet 452 and the magnet 453 have the same magnetism, a repelling force is generated to make the loudspeaker 43 move upward. When the user represses the key 42, such as moving the key 42 leftward to shut off the device, the connection rod 451 can drive the magnet 452 to misalign with the magnet 453, thereby making the loudspeaker 43 move downward.

In this embodiment of the invention, besides a key and a structural design, the loudspeaker can also be actuated to move upward or downward by a circuit control and a structural design. As far as the circuit control and the structural design are considered, the loudspeaker can move upward or downward by an operation signal such as a boot-up signal, a shutoff signal, or a signal of using software.

FIG. 5 is a block schematic diagram showing a loudspeaker moving upward or downward by a circuit control. A portable electronic device 5 includes an actuating unit 55 and a loudspeaker 53. The actuating unit 55 is coupled to the loudspeaker 53, and the actuating unit 55 actuates the loudspeaker 53 to move upward or downward according to an operation signal $S_O$. The actuating unit 55 can include a motor, a gear, a connection rod, a hinge, a magnet, other actuating element, or a combination thereof.

The operation signal $S_O$ can be generated by operating a key, a mouse, a touchpad, or other man-machine interfaces by a user. The operation signal $S_O$ may be a boot-up signal, a shutoff signal, or a signal of using software. For example, when the user boots up a device, the actuating unit 55 actuates the loudspeaker 53 to move upward according to the operation signal $S_O$ (the boot-up signal). When the user shuts off the device, the actuating unit 55 actuates the loudspeaker 53 to move downward, such as to return to the original position, according to the operation signal $S_O$ (the shutoff signal). When the user uses certain software, such as media software, the actuating unit 55 actuates the loudspeaker 53 to move upward according to the operation signal $S_O$ (the signal of using software). When the user closes the software, the actuating unit 55 actuates the loudspeaker 53 to move downward, such as to return to the original position, according to the operation signal $S_O$.

The portable electronic device 5 can further include a control unit 57. The control unit 57 is coupled to the actuating unit 55 and transmits a control signal $S_C$ to the actuating unit 55 according to the operation signal $S_O$. An electronic element of the actuating unit 55, such as a motor, is actuated by receiving the control signal $S_C$. Thus, the loudspeaker 53 is actuated to move upward or downward. The control signal $S_C$ can be different with the different types of the motor. For example, a DC motor may receive a DC control signal; an AC motor may receive an AC control signal; a pulse motor may receive a pulse control signal. In addition, the control unit 57 can include a chip such as a central processing unit (CPU) or a micro-control unit (MCU).

Figure 6:
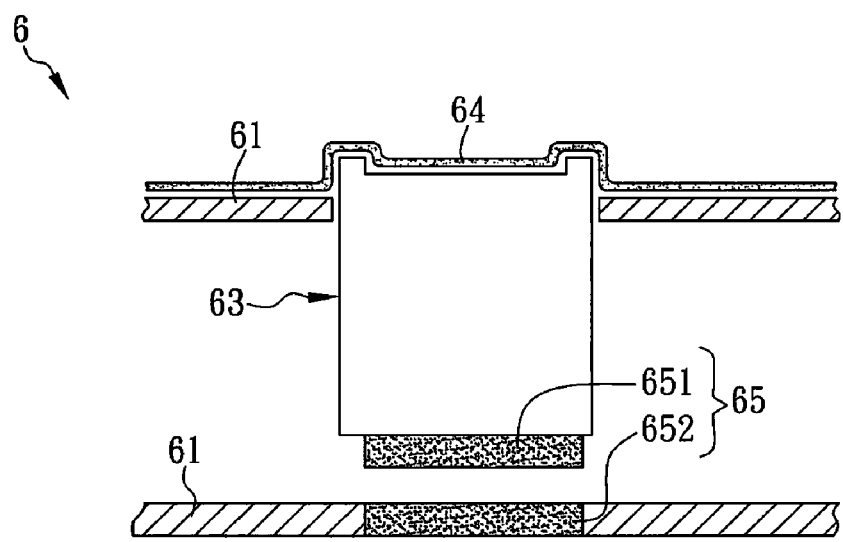
FIG. 6 and FIG. 7 are schematic diagrams showing a loudspeaker of a portable electronic device moving upward or downward by a circuit control and a structural design according to a preferred embodiment of the invention.

In FIG. 6, a portable electronic device 6 includes a casing 61, a loudspeaker 63, a soft insulating material 64, and an actuating unit 65. The loudspeaker 63 is embedded into the casing 61. The soft insulating material 64 covers the casing 61 and the loudspeaker 63. The actuating unit 65 is coupled to the loudspeaker 63. According to an operation signal, the loudspeaker 63 is actuated to move upward or to move downward.

The actuating unit 65 can include a motor, a gear, a connection rod, a hinge, a magnet, other actuating elements, or a combination thereof, and it can be designed according to practical needs. In this embodiment, the actuating unit 65 includes a magnet 651 and an electromagnet 652. The magnet 651 is disposed at the loudspeaker 63, and the electromagnet 652 is disposed at the casing 61.

Thereby, when a user boots up a device, uses software, or performs other operations to generate an operation signal, the control unit transmits a corresponding control signal to the electromagnet 652 to make the electromagnet 652 generate magnetism. Then a repelling force is generated between the magnetic field of the electromagnet 652 and the magnetic field of the magnet 651 to make the loudspeaker 63 move upward. When the user shuts off the device, closes the software, or performs other operations to generate an operation signal, the control unit stops transmitting the control signal to the electromagnet 652, the magnetic field of the electromagnet 652 disappears to make the loudspeaker 63 move downward. Otherwise, the control unit transmits another control signal to the electromagnet 652 to make the magnetic field of the electromagnet 652 and the magnetic field of the magnet 651 attract each other, thus to make the loudspeaker 63 move downward.

Figure 7:
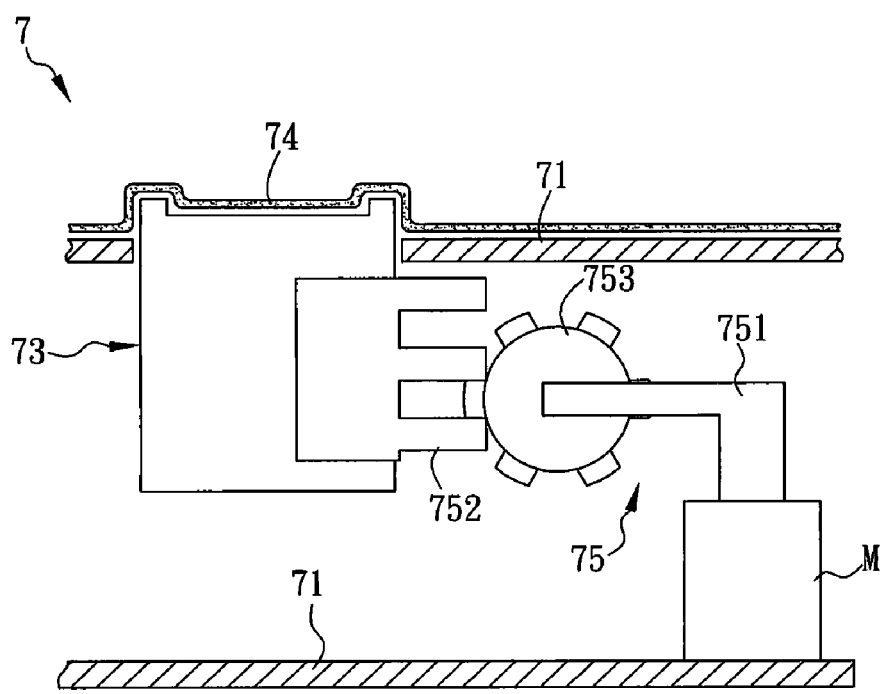

In FIG. 7, a portable electronic device 7 includes a casing 71, a loudspeaker 73, a soft insulating material 74, and an actuating unit 75. The loudspeaker 73 is embedded into the casing 71. The soft insulating material 74 covers the casing 71 and the loudspeaker 73. The actuating unit 75 is coupled to the loudspeaker 73. According to an operation signal, the loudspeaker 73 is actuated to move upward or to move downward.

The actuating unit 75 can include a motor, a gear, a connection rod, a hinge, a magnet, other actuating elements, or a combination thereof, and it can be designed according to practical needs. In this embodiment, the actuating unit 75 includes connection rods 751, 752, a gear 753, and a motor M. Two ends of the connection rod 751 are connected with the motor M and the gear 753, respectively. The motor M drives the gear 753 to rotate. The connection rod 752 is connected with the loudspeaker 73, and it has a plurality of recessed portions engaged with the gear 753.

Thereby, when a user boots up a device, uses software, or performs other operations to generate an operation signal, the control unit transmits a corresponding control signal to the motor M. The motor M drives the connection rod 751, the gear 753, and the connection rod 752 to operate, further to make the loudspeaker 73 move upward. When the user shuts off the device, closes the software, or performs other operations to generate an operation signal, the control unit transmits another control signal to the motor M. The motor M is inversely driven, thus to make the loudspeaker 73 move downward.

To sum up, in the invention, when the key is actuated, the loudspeaker can be actuated to move upward or downward by the actuating unit. The loudspeaker can also be actuated to move upward or downward by the actuating unit according to the operation signal, such as a boot-up signal, a shutoff signal, or a signal of using software. For example, when a user presses a power key to boot up a device, the adjacent loudspeaker moves upward; or when the user starts media software, the loudspeaker moves upward; or when the user shuts off the device, the upward loudspeaker moves downward. Thereby, the fashion design can be improved. Further, when the user does not need to use the loudspeaker, he or she can be prevented from contacting the loudspeaker.

In addition, the soft insulating material, such as cloth, leather, or silica gel and so on, covers the loudspeaker. Thus, when the loudspeaker moves upward, the soft insulating material provides a protrudent and recessed feeling, thereby providing different textures. Further, the soft insulating material can absorb perspiration or liquid inadvertently falling.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A portable electronic device comprising:
    a casing;
    a key disposed at the casing;
    a loudspeaker embedded into the casing flatly;
    a soft insulating material covering the casing and the loudspeaker; and
    an actuating unit coupled to the key and the loudspeaker, the actuating unit actuating the loudspeaker to protrude from the casing in response to an actuation of the key.

2. The portable electronic device according to claim 1, wherein the soft insulating material comprises cloth, leather, synthetic leather, rubber, silica gel, or a combination thereof.

3. The portable electronic device according to claim 1, wherein the actuating unit comprises a gear, a connection rod, a hinge, a magnet, or a combination thereof.

4. The portable electronic device according to claim 1, wherein the portable electronic device comprises a keyboard, a notebook computer, a communication device, or a media player.

5. A portable electronic device comprising:

a casing;

a loudspeaker embedded into the casing flatly;

a soft insulating material covering the casing and the loudspeaker; and an actuating unit coupled to the loudspeaker and actuating the loudspeaker to protrude from the casing in response to an operation signal.

6. The portable electronic device according to claim 5, wherein the soft insulating material comprises cloth, leather, synthetic leather, rubber, silica gel, or a combination thereof.

7. The portable electronic device according to claim 5, wherein the operation signal is a boot-up signal, a shutoff signal, or a signal of using software.

8. The portable electronic device according to claim 5, wherein the operation signal is generated by a key, a mouse, or a touchpad.

9. The portable electronic device according to claim 5, wherein the actuating unit comprises a motor, a gear, a connection rod, a hinge, a magnet, or a combination thereof.

10. The portable electronic device according to claim 5, further comprising:

a control unit coupled to the actuating unit and transmitting a control signal to the actuating unit according to the operation signal.

11. The portable electronic device according to claim 5, wherein the portable electronic device comprises a keyboard, a notebook computer, a communication device, or a media player.

* * * * *